United States Patent [19]

Kai et al.

[11] Patent Number: 4,490,830
[45] Date of Patent: Dec. 25, 1984

[54] RADIO SIGNAL TRANSMISSION SYSTEM INCLUDING A PLURALITY OF TRANSMITTERS FOR TRANSMITTING A COMMON SIGNAL

[75] Inventors: Tomokazu Kai; Toshihide Tsuboi, both of Tokyo, Japan

[73] Assignee: Nippon Electric Co., Ltd., Tokyo, Japan

[21] Appl. No.: 396,581

[22] Filed: Jul. 9, 1982

[30] Foreign Application Priority Data

Jul. 22, 1981 [JP] Japan ............................. 56-114766

[51] Int. Cl.³ .............................................. H04B 7/02
[52] U.S. Cl. ....................................... 375/40; 375/57; 455/52; 455/59; 455/101
[58] Field of Search ...................................... 455/50–52, 455/59, 63, 101, 103; 375/38, 40, 59, 60

[56] References Cited

U.S. PATENT DOCUMENTS

| 1,987,889 | 1/1935 | Beverage et al. | 455/52 |
| 2,033,271 | 3/1936 | Aiken | 455/101 |
| 2,966,583 | 12/1960 | Ross | 455/101 |
| 3,882,393 | 5/1975 | Epstein | 455/52 |
| 4,223,405 | 9/1980 | Hattori et al. | 455/59 |
| 4,255,814 | 3/1981 | Osborn | 455/51 |

Primary Examiner—Benedict V. Safourek
Attorney, Agent, or Firm—Sughrue, Mion, Zinn, Macpeak and Seas

[57] ABSTRACT

A single data signal is transmitted by two transmitters to two radio zones having an overlapping zone therebetween. The data signal is frequency or phase modulated and is mixed in the transmitters with RF carrier waves of equal frequency. The data signal to one of the transmitters is delayed between 5° and 50° with respect to the original data signal to provide a phase difference between the transmitted signals.

6 Claims, 6 Drawing Figures

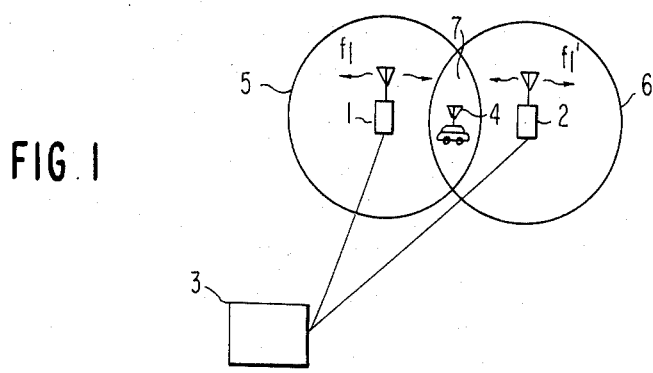
FIG. 1
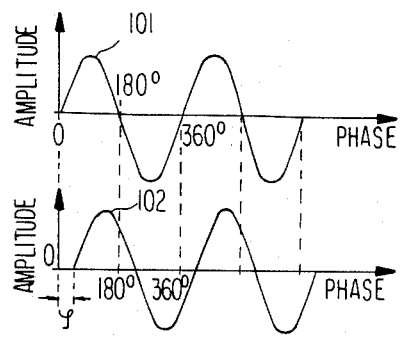
FIG. 3A
FIG. 3B
FIG. 2
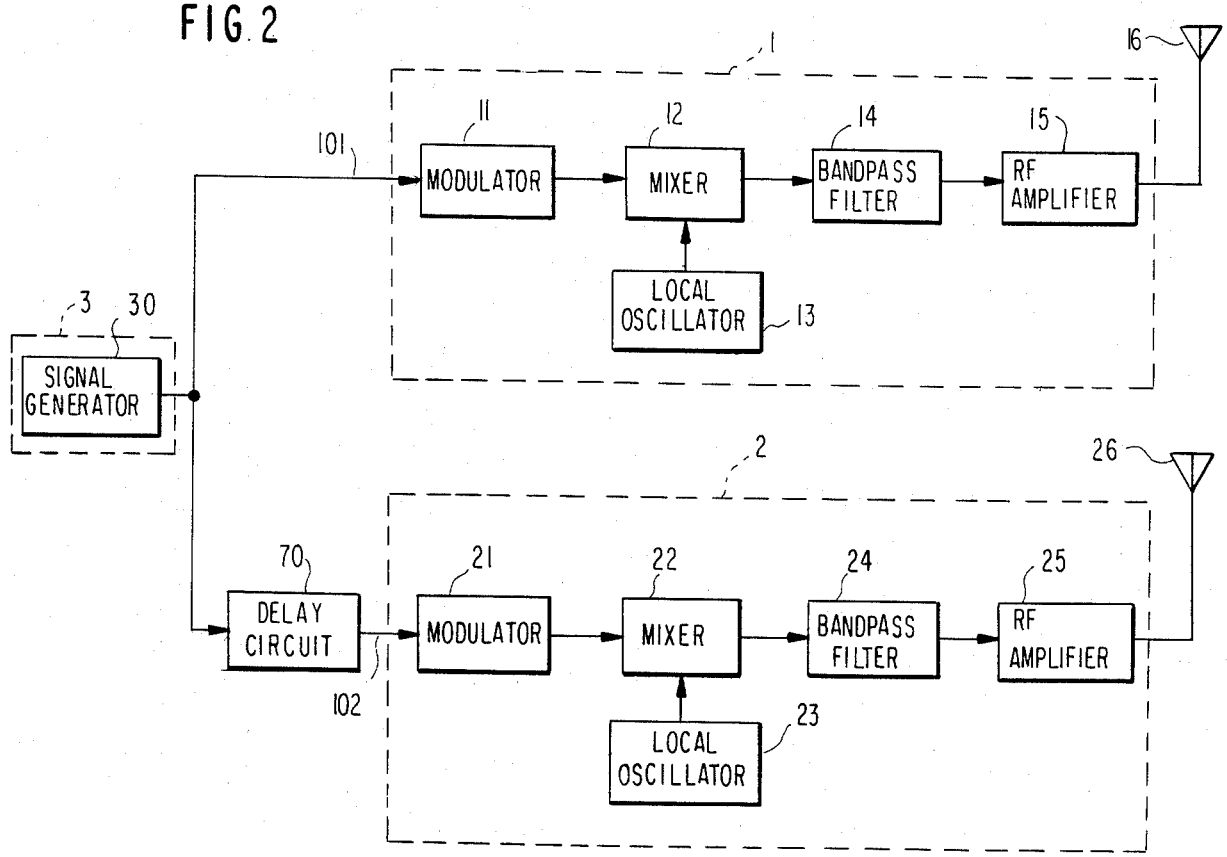

RADIO SIGNAL TRANSMISSION SYSTEM INCLUDING A PLURALITY OF TRANSMITTERS FOR TRANSMITTING A COMMON SIGNAL

BACKGROUND OF THE INVENTION

The present invention relates to a radio communication system such as a mobile radio telephone system which comprises a plurality of mobile units and a plurality of transmitting stations located in a plurality of radio zones constituting a service area. More particularly, the present invention relates to a radio signal transmission system or to a transmission diversity system wherein the plurality of stations transmit the same common signal (such as a calling signal) to a mobile unit by a plurality of carrier waves.

In a radio signal transmission system of this type, the stations generally use carrier waves of the same frequency to carry the same common signal in order to promote efficient frequency utilization. However, the carrier wave from each station often interferes with that from another station, producing a code error. This interference occurs in an "overlapping zone" between adjacent radio zones. In order to overcome such a problem, the following three transmission methods have been proposed.

In a first transmission method, as disclosed in U.S. Pat. No. 4,032,846 issued on June 28, 1977, the center frequency of the carrier waves at each of the plurality of transmitting stations are offset relative to each other. A drawback inherent in this method is that the carrier frequencies must be highly stable to maintain a constant offset.

A second transmission method proposed in the prior art employs an identical center frequency for each station but varies the modulation index at each station relative to each other. This is undesirable in that the S/N ratio of the signal is degraded in a zone of a lower modulation index except in the overlapping zone.

A third transmission method, as disclosed in U.S. Pat. No. 4,223,405 issued on September 16, 1980, used modulation signals whose waveforms differ from each other by a discrete amount. The disadvantage of this third transmission method is that both a wave shaping circuit (for producing the difference in waveform) and a wave combining circuit are necessary additions to the structure of the transmitters.

SUMMARY OF THE INVENTION

It is an object of the present invention to provide a radio signal transmission system of simple construction which is free from the various drawbacks discussed above while minimizing the above-mentioned code error.

According to the present invention, there is provided a radio signal transmission system wherein first and second transmitters transmits a common signal with first and second carrier waves of substantially identical frequency in respective radio zones which have an overlapping zone, said system comprising: first means for generating the common signal; second means coupled to the first means for delaying the common signal to provide a delayed common signal; third and fourth means for generating the first and second carrier waves, respectively; fifth and sixth means for angle-modulating the first and second carrier waves with the common signal and the delayed common signal, respectively; and seventh and eighth means coupled to the fifth and sixth means for transmitting the angle-modulated first and second carrier waves, respectively, whereby the angle-modulated first and second carrier waves composed in the overlapping zone provide a common signal of a reduced code error rate.

BRIEF DESCRIPTION OF THE DRAWINGS

The objects and characteristic features of the present invention will be described hereunder with reference to the accompanying drawings, in which:

FIG. 1 is a schematic illustration of a radio signal transmission system of a mobile radio communication system which includes radio transmitter stations respectively located in radio zones and a mobile station;

FIG. 2 is a block diagram of a radio signal transmission system embodying the present invention;

FIGS. 3A and 3B show waveforms of signals appearing on lines 101 and 102, respectively;

THE DETAILED DESCRIPTION OF THE INVENTION

Figure 4:
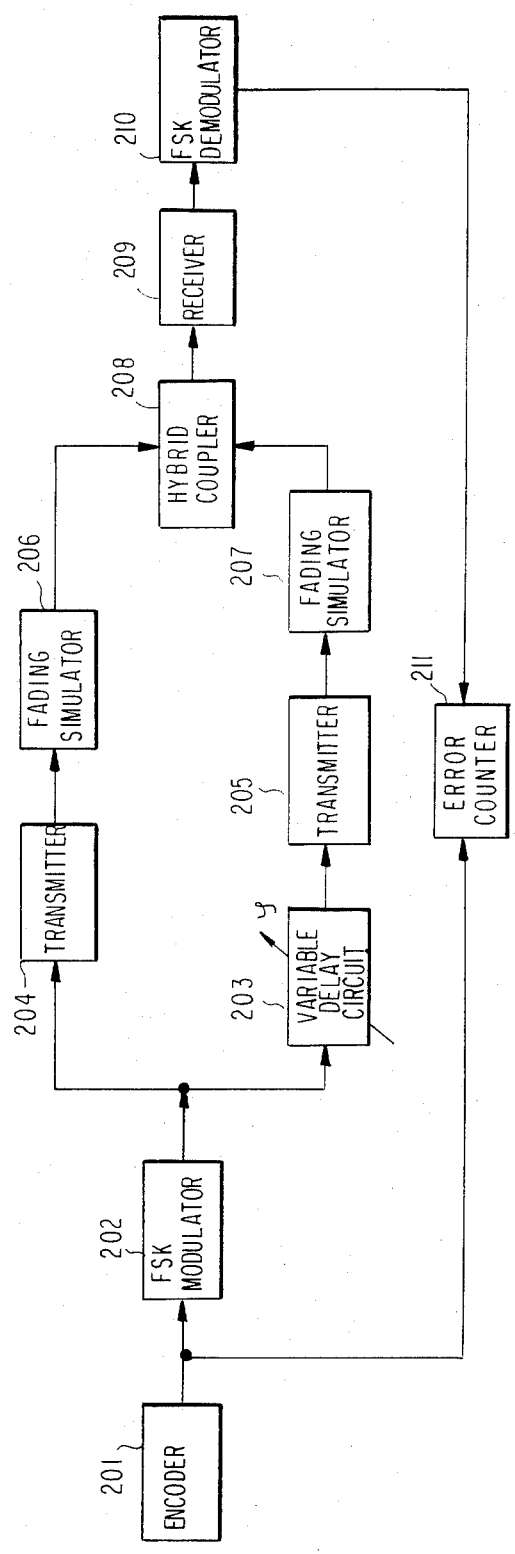
FIG. 4 is a block diagram of an apparatus for measuring a code error rate in the radio signal transmission system of the present invention.

Referring to FIG. 1, stations 1 and 2 transmit carrier waves of the same frequency $f_1$ and $f_1'$, respectively. Radio zones 5 and 6 allocated to the respective stations or transmitters 1 and 2 overlap with each other in a zone designated by reference numeral 7. This overlapping zone 7 is not objectionable in any way as long as the frequencies $f_1$ and $f_1'$ and the phases of the two carrier waves are identical to each other. However, it is quite difficult in practice to produce two carrier waves which are identical in both frequency and phase. A difference in frequency, if small, will result in beating; an inversion in phase will cause the carrier waves to cancel each other, thereby resulting in a loss of signal. More specifically, the beat period grows longer as the frequencies $f_1$ and $f_1'$ become closer to each other and, once the phases are mutually opposite, the signals will cancel over a considerably long time. Hence, the error rate is increased when a mobile vehicle 4 in the overlapping zone 7 receives a data signal which has been transmitted from a central or control station 3 through both stations 1 and 2. For details of such a radio signal transmission system, refer to U.S. Pat. No. 4,144,409 issued on Mar. 13, 1979.

The present invention discloses a transmission system having minimum code error. For this purpose, the modulating signal at each station 1 or 2 can be either by a rectangular signal whose amplitude in one period is not constant or a signal whose amplitude varies continuously like a sinusoidal wave. In either case, the modulating signals at the stations 1 and 2 are provided with a suitable difference in phase relative to each other so that the frequencies $f_1$ and $f_1'$ at each moment are different from each other, causing a fine or short period beating.

The frequency modulation utilized in the present invention will now be described for the case where a sinusoidal wave is employed as the modulating signal. The modulated carrier waves $F_1$ and $F_1'$ sent from the stations 1 and 2 may be expressed by the following equations (1) and (2), respectively:

$$F_1 = V_1 \sin(\omega_o t + m_f \sin \omega_s t) \qquad (1)$$

$$F_1' \sin\{(\omega_o + \Delta\omega)t + \phi + m_f \sin(\omega_s t + \psi)\} \qquad (2)$$

where $V_1$ and $V_1'$ denote amplitudes of the carrier waver; $\omega_o$, the angular frequency of the carrier wave; $\Delta\omega$, the difference between the angular frequencies of the carrier waves; $\phi$, the phase difference between the carrier waves; $\omega_s$, the angular frequency of the modulating wave; $\psi$, the phase difference between the modulating waves; and $m_f$, the modulation index. Where $D/D' = 0$ dB ($V_1 = V_1'$), meaning that the two carrier waves are received in an overlapping zone with the same intensity, the composite received wave is expressed as:

$$F_1 + F_1' = 2V_1 \cos\left\{\frac{\Delta\omega}{2} t + \frac{\phi}{2} + \sin\frac{\psi}{2} \cdot m_f \cdot \cos\left(\omega_s t + \frac{\psi}{2}\right)\right\} \times \sin\left\{\left(\omega_o + \frac{\Delta\omega}{2}\right) t + \frac{\phi}{2} + m_f \cdot \cos\frac{\psi}{2} \cdot \sin\left(\omega_s t + \frac{\psi}{2}\right)\right\} \qquad (3)$$

where $2V_1 \cos\left\{\frac{\Delta\omega}{2} t + \frac{\phi}{2} + \sin\frac{\psi}{2} \cdot m_f \cdot \cos\left(\omega_s t + \frac{\psi}{2}\right)\right\}$ represents the amplitude component of the composite received wave. Equation (3) shows that the amplitude of the composite wave is doubled, which is optimum, when the signals $F_1$ and $F_1'$ are exactly the same, that is, when each of the carrier angular frequency difference $\Delta\omega$, carrier phase difference $\phi$ and modulating wave phase difference $\psi$ are zero. However, as previously discussed, such an optimum situation is generally impossible to attain. If the phase difference $\psi$ of the modulating wave is zero, the amplitude of the combined wave would be lost when $$\Delta\omega t + \phi = \pi$$

The closer the carrier frequencies of the carrier waves, the longer the time period for which code error occurs in a burst mode. In a critical case in which the two carrier frequencies $f_1$ and $f_1'$ are identical to each other, but different in phase by 180° (i.e. $\Delta\omega = 0$, $\phi = \pi$, and $\psi = 0$). The signals will not be received since $\Delta\omega t + \phi = \phi = \pi$. Nevertheless, it will be understood that the selection of a suitable phase difference $\psi$ of the modulating waves will cause fading at the period of the modulating waves and, thus, will remedy the lost signal condition in the above example.

Referring to FIG. 2, a radio signal transmission system or a transmission diversity system embodying the present invention includes a signal generator 30 allocated to a central or control station 3. The signal generator 30 generates an FSK (Frequency Shift Keying) signal in response to a digital signal. For example, the FSK signal has sinusoidal waves whose frequencies are 1300 Hz and 1700 Hz for "1" and "0" of a 600 bits/sec digital signal, respectively. The FSK signal is coupled to station 1 by a line 101 and is coupled to station 2 through a delay circuit 70 in a line 102. As shown in FIGS. 3A and 3B, the delay circuit 70 is constructed to delay the input to the station 2 by a phase $\psi$ with respect to the input to the station 1.

At the station 1, a modulator 11 frequency modulates an intermediate frequency ($f_m = 70$ MHz) with the signal (FIG. 3A) from the signal generator 30, though the modulation may be phase modulation. The modulated output of the modulator 11 is fed to a mixer 12 to be converted into a radio signal (frequency $f_r = 400$ MHz) by an output of a local oscillator 13 (frequency $f_L = 330$ MHz). The radio signal is delivered to an antenna 16 through a bandpass filter 14 and an RF amplifier 15.

Similarly to the station 1, station 2 comprises a modulator 21, a mixer 22, a local oscillator 23, a bandpass filter 24 and an RF amplifier 25. The delayed signal (FIG. 3B) fed to the station 2 is also transformed into a radio signal and then transmitted through an antenna 26.

Referring to FIG. 4, there is shown in block diagram an apparatus for measuring a code error rate in the transmission diversity system of the present invention. An encoder 201 generates a random digital signal of 600 bits/sec. The output signal of the encoder 201 is directly coupled to an FSK modulator 202 whose modulation is prescribed by CCITT's Recommendation V.23. The FSK modulator 202 produces FSK signals of 1300 Hz and 1700 Hz, as previously stated, in response to the input random digital signal. These FSK signals are delivered to a transmitter 204 directly and to a transmitter 205 through a variable delay circuit 201. The transmitters 204 and 205 have the same construction as the station 1 or 2 of FIG. 2. The 400 MHz radio signals from the respective transmitters 204 and 205 are fed to fading simulators 206 and 207 and are combined together by a hybrid coupler 207 whose output is fed to a receiver 209. The fading simulators 206 and 207 simulate a Rayleigh fading of the actual propagation path. The receiver 209 demodulates an FSK signal from the composite radio signal. The demodulated FSK signal is delivered to an FSK demodulator 210 to be transformed into a digital signal. An error counter 210 counts bit errors by comparing the demodulating digital signal with the digital signal from the encoder 201.

Figure 5:
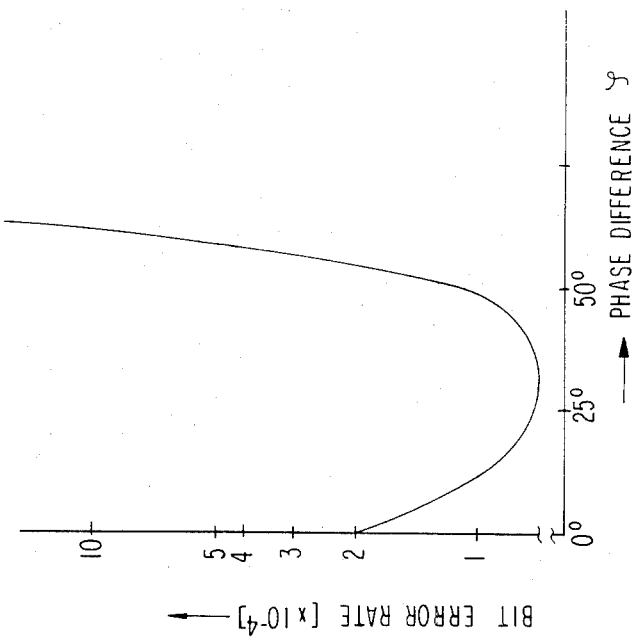
FIG. 5 is a graph showing a code error rate relative to a phase difference $\psi$, measured by the apparatus of FIG. 4.

FIG. 5 shows a curve which represents a variation in bit error rate under Rayleigh fading of 30 Hz resulting from a variation in the phase difference $\psi$ between the two digital signals, which was generated by the variable delay circuit 204. The curve shows that the error rate is reduced when the phase difference is within the range of 5° to about 50°. Particularly, phase difference of 20° to 40° enables the error rate to be reduced to a significant degree.

Apart from the digital transmission system using FSK signal of CCITT's Recommendation V.23, as shown and described above, the present invention is similarly applicable to a digital signal using direct FSK and tone signals. The sinusoidal wave employed for the embodiment may be replaced by a wave whose amplitude smoothly varies with time, as in, for example, a triangular wave.

In summary, the transmission diversity system of the present invention allows a plurality of stations to transmit the same carrier waves, which are angle-modulated by the same data signals (tone or digital signal) and whose phases are different. It achieves the following desirable effects:

(1) that the error in the data signal is at a minimum even in overlapping zones;

(2) that degradation in the S/N ratio of the data signal is prevented in zones other than the overlapping zones; and (3) that each station can dispense with a wave shaping circuit and a wave coupling circuit.

What is claimed is:

1. A radio signal transmission system wherein first and second transmitters transmit a common data signal with first and second carrier waves of the substantially identical frequency to first and second radio zones having an overlapping zone therebetween, said transmission system comprising:
   (a) first means for generating said common data signal;
   (b) second means coupled to said first means for phase delaying said common data signal to provide a delayed common data signal;
   (c) third and fourth means for generating said first and second carrier waves, respectively;
   (d) fifth and sixth means for angle-modulating said first and second carrier waves with said common data signal and said delayed common data signal, respectively; and
   (e) seventh and eighth means coupled to said fifth and sixth means for transmitting said angle-modulated first and second carrier waves, respectively, whereby said angle-modulated first and second carrier waves combine in said overlapping zone to provide a common data signal of a low code error rate.

2. A radio signal transmission system as claimed in claim 1, wherein said common data signal is an FSK signal.

3. A radio signal transmission system as claimed in claim 1, wherein said common data signal is a tone signal.

4. A radio signal transmission system as claimed in claim 1, 2 or 3, wherein said second means provides a phase difference between said common data signal and said delayed common data signal, said phase difference being within the range of 20° to 40°.

5. A radio signal transmission system as claimed in claim 1, wherein said delayed common data signal has a phase difference of between about 5° and about 50° with respect to said common data signal.

6. A radio signal transmission system as claimed in claim 1, said radio signal transmission system comprising a mobile radio signal transmission system wherein said angle-modulated first and second carrier waves combine in said overlapping zone at a mobile receiver to provide said common data signal of low code error rate.

* * * * *

UNITED STATES PATENT AND TRADEMARK OFFICE
CERTIFICATE OF CORRECTION

PATENT NO. : 4,490,830

DATED : December 25, 1985

INVENTOR(S) : Tomokazu KAI; Toshihide TSUBOI

It is certified that error appears in the above-identified patent and that said Letters Patent is hereby corrected as shown below:

Column 3, line 3, after the first "[" insert --(--.
Column 4, line 39, change "210" to --211--.
Column 4, line 41, "demodulating" should be --demodulated--
Column 4, line 49, before "phase" insert --a--.

Signed and Sealed this

Seventeenth Day of September 1985

[SEAL]

*Attest:*

*Attesting Officer*

DONALD J. QUIGG

*Commissioner of Patents and Trademarks—Designate*